United States Patent
Tarsauliya et al.

(10) Patent No.: US 11,924,226 B2
(45) Date of Patent: Mar. 5, 2024

(54) DEVICE ANALYTICS ENGINE

(71) Applicant: PAYPAL, INC., San Jose, CA (US)

(72) Inventors: Anupam Tarsauliya, Hyderabad (IN); Ravi Shanker Sandepudi, Hyderabad (IN); Yugal Sharma, Hyderabad (IN); Sai Krishna Pinna, Telangana (IN)

(73) Assignee: PayPal, Inc., San Jose, CA (US)

( * ) Notice: Subject to any disclaimer, the term of this patent is extended or adjusted under 35 U.S.C. 154(b) by 431 days.

(21) Appl. No.: 17/166,097

(22) Filed: Feb. 3, 2021

(65) Prior Publication Data

US 2022/0201010 A1    Jun. 23, 2022

(30) Foreign Application Priority Data

Dec. 17, 2020   (IN) .............................. 202041054915

(51) Int. Cl.
*H04L 9/40* (2022.01)
*G06F 8/30* (2018.01)
*G06F 16/2455* (2019.01)

(52) U.S. Cl.
CPC ............ *H04L 63/1416* (2013.01); *G06F 8/31* (2013.01); *G06F 16/24558* (2019.01)

(58) Field of Classification Search
CPC . H04L 63/1416; G06F 8/31; G06F 16/24558; G06F 21/73; G06F 2221/2111; G06F 2221/2141; G06F 21/44; G06F 21/604; G06F 2221/034
See application file for complete search history.

(56) References Cited

U.S. PATENT DOCUMENTS

| | | | | |
|---|---|---|---|---|
| 10,091,312 B1* | 10/2018 | Khanwalkar | ......... | H04L 67/306 |
| 10,902,327 B1* | 1/2021 | Yalov | ..................... | G06N 20/00 |
| 2010/0323790 A1* | 12/2010 | Etchegoyen | .......... | G06F 21/123 |
| | | | | 463/43 |
| 2012/0233665 A1* | 9/2012 | Ranganathan | .......... | G06F 21/33 |
| | | | | 726/4 |

* cited by examiner

*Primary Examiner* — Mohammad W Reza
(74) *Attorney, Agent, or Firm* — Haynes and Boone, LLP

(57) ABSTRACT

Systems, methods, and computer program products for identifying a fraudulent device. A device analytics engine receives device data from a computing device, the device data including parameters associated with the computing device. The device analytics engine selects a set of rules in a plurality of rules that indicate at least one parameter in the plurality of parameters in the device data for determining a device identifier. The set of rules are evaluated in an order until the device identifier is determined from the at least one parameter indicated in the set of rules, the device data, and previously stored data from multiple computing devices. A score is generated for the computing device using one or more of the device identifier, device data, a set of rules, and previously receive device data that corresponds to the device identifier. A computing device is identified as a fraudulent computing device based on the score.

20 Claims, 5 Drawing Sheets

DEVICE ANALYTICS ENGINE

CROSS-REFERENCE TO RELATED APPLICATIONS

This application is a nonprovisional of and claims priority under 35 U.S.C. 119 to an Indian Application No. IN202041054915, filed Dec. 17, 2020, which is hereby expressly incorporated by reference herein in its entirety.

TECHNICAL FIELD

The disclosure generally relates to fraud prevention, and more specifically to identifying fraudulent computing devices in a network.

BACKGROUND

Fraudsters or other bad actors attempt to defraud online service providers or steal legitimate user identities using computing devices. Often fraudsters use the same computing device or the same set of computing devices. These computing devices include different online profiles and evasive network information and attempt transactions that emulate legitimate users.

Figure 1:
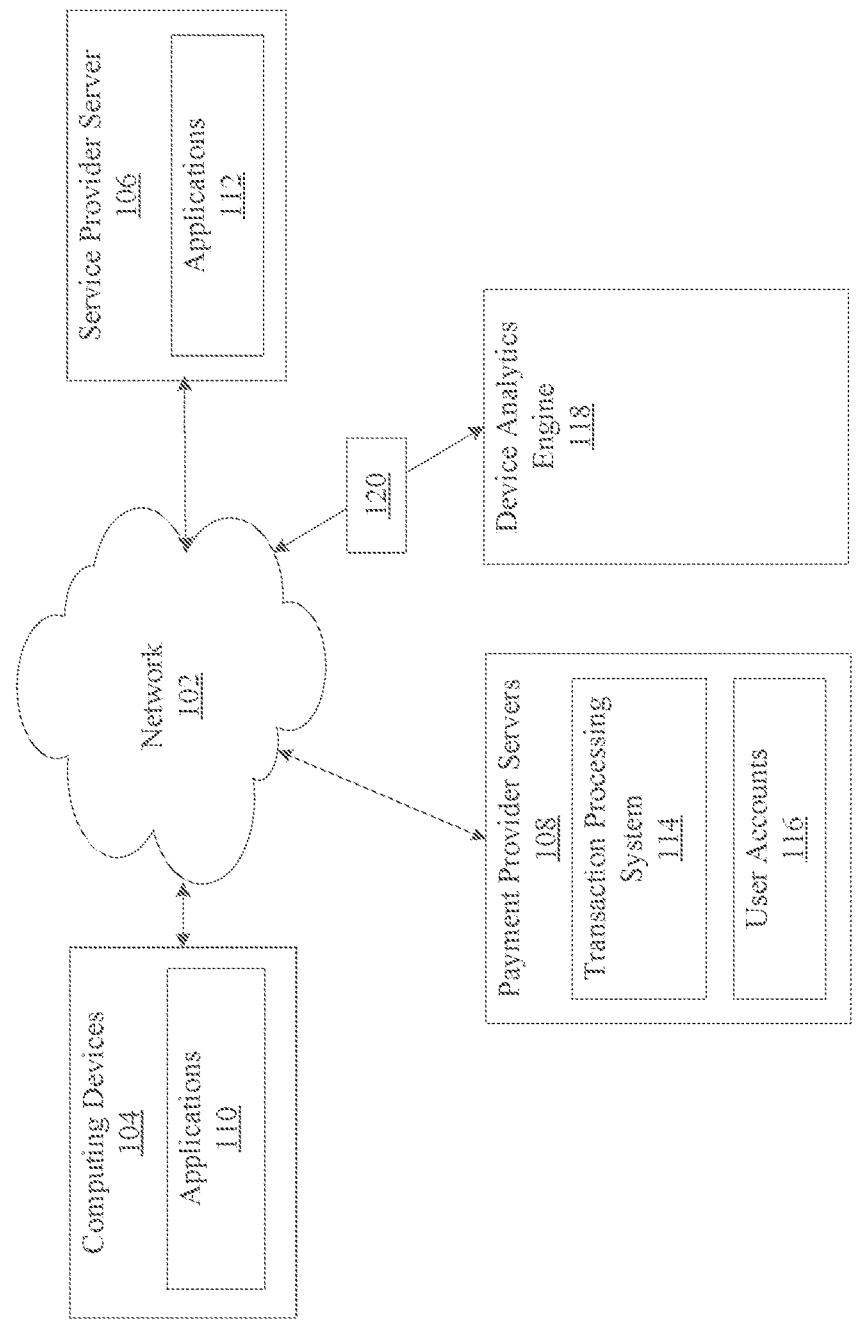
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Fraudsters attempt to emulate legitimate users in a computer network to steal money, user identities and the like. To steal money, user identities, etc., fraudsters often use the same computing device or the same set of computing devices. To reduce fraud and identify theft, the embodiments are directed to a device analytics engine that identifies a fraudulent computing device based on the device data generated by the computing device. The device analytics engine is pre-programmed with rules that the device analytics engine uses to identify a device identifier of the computing device. The rules indicate one or more parameters. The one or more parameters in the rules indicate which parameters in the device data may be used to determine the device identifier.

In an embodiment, the device analytics engine may select a set of rules from the rules to identify the device identifier for the computing device. The set of rules may be selected based on a software development toolkit (SDK) parameter that is included in the device data. In this way, the set of rules may be tailored to parameters that may be used by the SDK that executes on the computing device, such as a JavaScript (JS) SDK, an Android SDK or an iOS SDK. Each rule may indicate a combination of one or more parameters that may be retrieved from the device data and compared against the parameters that were previously received or stored in the device analytics engine. The device identifier may be identified based on the comparison. In another embodiment, the device identifier may select a rule, such as a rule that indicates a user cookie in the device data. Using this rule, the device analytics engine may retrieve the user cookie and compare the user cookie to the user cookies in the previously stored data. The device identifier may be identified based on the comparison.

In an embodiment where the rules do not identify a device identifier for a computing device, the analytics device engine may generate the device identifier from the device data.

Once the device identifier is determined or generated, the device analytics engine may use the device identifier to generate a score for the computing device. The score may be based on whether the device analytics engine identified or generated the device identifier, the device data, and the device data that has been previously received or stored by the device analytics engine. Based on the score, the device analytics engine may determine whether the computing device is being used to conduct a legitimate transaction or a fraudulent transaction.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104, service provider server(s) 106, payment provider server(s) 108, and device analytics engine(s) 118. Computing devices 104 may be portable and non-portable electronic devices under the control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106 and/or payment provider server(s) 108. Applications 110 may execute on computing devices 104 and receive instructions and data from a user, from service provider server(s) 106, and payment provider server(s) 108.

Example applications 110 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, CA, USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. Applications 110 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 110 may be location detection applications, such as a mapping, compass, and/or global positioning system (GPS) applications, social networking applications and/or merchant applications. Additionally, applications 110 may be service applications that permit a user of computing device 104 to receive, request and/or view information for products and/or services, and also permit the user to purchase the selected products and/or services.

In an embodiment, applications 110 may utilize numerous components included in computing device 104 to receive input, store and display data, and communicate with network 102. Example components are discussed in detail in FIG. 5.

As discussed above, one or more service provider servers 106 may be connected to network 102. Service provider server 106 may also be maintained by a service provider, such as PAYPAL®, a telephonic service provider, social networking service, and/or other service providers. Service provider server 106 may be software that executes on a computing device configured for large scale processing and that provides functionality to other computer programs, such as applications 110 and applications 112 discussed below.

In an embodiment, service provider server 106 may initiate and direct execution of applications 112. Applications 112 may be counterparts to applications 110 executing on computing devices 104 and may process transactions at the requests of applications 110. For example, applications 112 may be financial services applications configured to transfer money world-wide, receive payments for goods and services, manage money spending, etc., that receive message from the financial services applications executing on computing device 104. Applications 112 may be security applications configured to implement client-side security features or programmatic client applications for interfacing with appropriate application programming interfaces (APIs) over network 102. Applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, applications 110 and applications 112 may process transactions on behalf of a user. In some embodiments, to process transactions, applications 110, 112 may request payments for processing the transactions via payment provider server(s) 108. For instance, payment provider server 108 may be a software application that is configured to receive requests from applications 110, 112 that cause the payment provider server 108 to transfer funds of a user using application 110 to service provider associated with application 112. Thus, applications 110 and 112 may receive user data, including user authentication data, for processing any number of electronic transactions, such as through payment provider server 108.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 106 and vice versa.

Each payment provider server 108 may include a transaction processing system 114. Transaction processing system 114 may correspond to processes, procedures, and/or applications executable by a hardware processor. In an embodiment, transaction processing system 114 may be configured to receive information from one or more applications 110 executing on computing devices 104 and/or applications 112 executing on service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106.

Payment provider server 108 may also include user accounts 116. Each user account 116 may be established by one or more users using applications 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or another memory storage described in detail in FIG. 5.

In an embodiment, system 100 includes device analytics engine 118. Device analytics engine 118 may determine or help determine whether transactions generated by computing devices 104, servers 106, and/or applications 110, 112 are fraudulent devices based on the riskiness score and historical engagements, which in turn may help identify potential fraudulent transactions. Fraudulent transactions are transactions that emulate transactions initiated by legitimate users, vendors, merchants, etc., in an attempt to steal money, user identities, personally identifiable information (PII), account data, etc. When fraudsters initiate fraudulent transactions, fraudsters may use the same computing device 104 or the same set of computing devices 104 and cause computing device(s) 104 to perform fraudulent transactions. Fraudsters may use computing device(s) 104 to create different online profiles used by applications 110, 112, transaction processing system 114, or service provider server 106. Fraudsters may also manipulate computing device(s) 104 to generate evasive network information. To detect fraudulent transactions, device analytics engine 118 may collect device data 120 generated by hundreds, thousands, or more of computing device(s) 104, applications 110, 112, transaction processing systems 114, and/or server provider servers 106 in system 100. To collect device data 120, device analytics engine 118 may communicate with computing device(s) 104, applications 110, 112, transaction processing systems 114, service provider servers 106 and/or other components not shown in FIG. 1. For example, device analytics engine 118 may send a code or a script to computing device(s) 104, applications 110, 112, transaction processing systems 114, etc., for execution. This code or script, once executed, may collect device data, and transmit the device data to device analytics engine 118. Based on the device data, device analytics engine 118 may determine whether transactions that originate at computing device(s) 104, applications 110, 112, transaction processing systems 114, service provider servers 106, etc., are genuine or fraudulent transactions.

In some embodiments, device analytics engine 118 may be implemented on a standalone computing device or within one of the servers, such as payment provider servers 108 or service provider servers 106 shown in system 100. In other embodiments, various components of device analytics engine 118 may be implemented on different devices (not shown).

Figure 2:
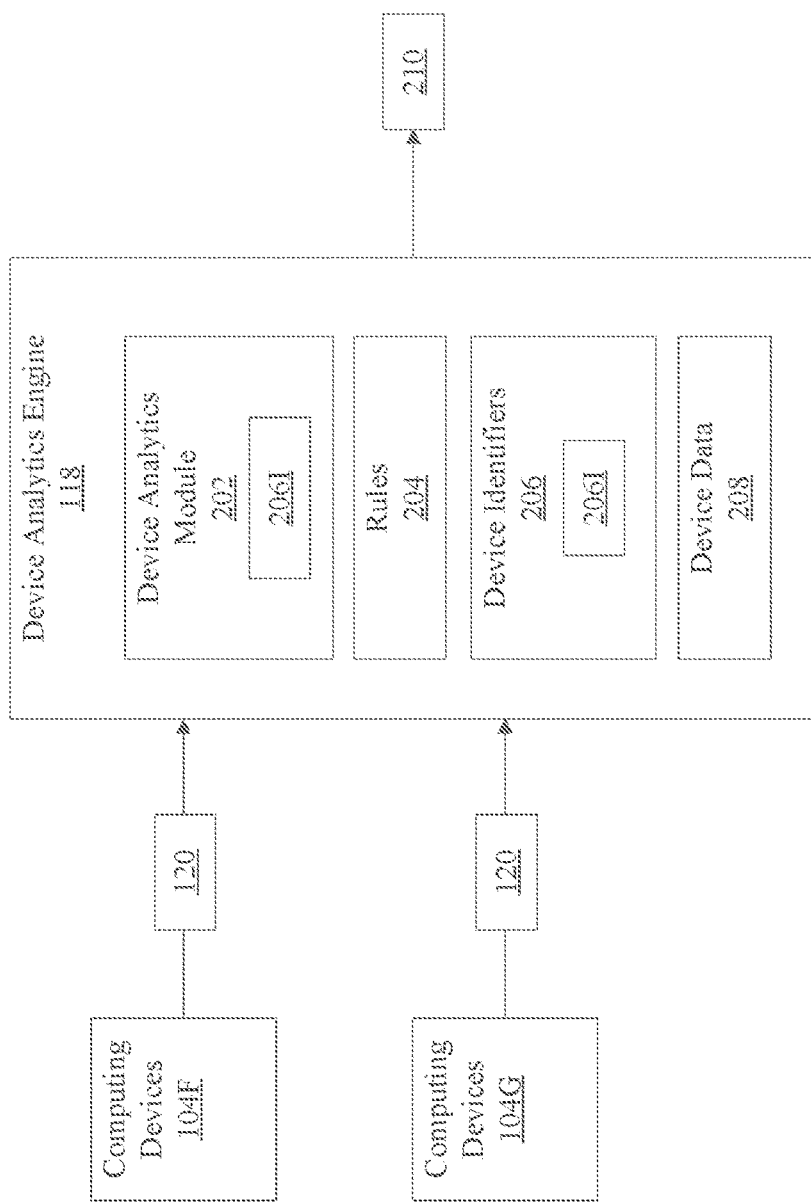
FIG. 2 is a block diagram of a device analytics engine, according to an embodiment.

FIG. 2 is a block diagram 200 of device analytics engine 118, according to an embodiment. As illustrated in FIG. 2, device analytics engine 118 may include a device analytics module 202, rules 204, device identifiers 206, and device data 208. Device analytics module 202 may be software or hardware that executes within device analytics engine 118. Rules 204, device identifiers 206, and device data 208 may be stored within device analytics engine 118 or in a memory coupled and accessible to device analytics engine 118. Device analytics engine 118 may also receive device data 120 from computing devices 104, and use device analytics module 202 to determine whether the computing devices 104, such as computing devices 104G and 104F, are computing devices generating or initiating genuine or fraudulent transactions, also referred to herein as "genuine" or "fraudulent" computing devices, respectively. Fraudulent computing device 104F is operated by a fraudster and transmits and receives instructions to perform fraudulent transactions. Genuine computing device 104 is operated by a legitimate user and transmits and receives instructions to perform legitimate transactions.

In some embodiments, device data 208 may be device data 120 that was previously received from computing devices 104. The device data 208 may be linked to device identifiers 206 that identify computing devices 104 that generated device data 208. Device data 208 may have previously been processed by device analytics engine 118. Once device analytics engine 118 processes device data 120, device data 120 may be stored as device data 208.

In an embodiment, device data 120, 208, may include multiple parameters. These parameters may include attributes associated with computing device 104, location of computing device 104, attributes of applications 110, 112 executing on computing device 104, network information of computing device 104, location parameters, temporal parameters, etc. In one example, a parameter may include a type of a software development toolkit (SDK) or a type of an operating system that is executing on computing device 104. An example SDK may be a JavaScript (JS) SDK, an Android SDK, or an iOS SDK. In another example, a parameter may be a user cookie. In another example, parameters may include a type of a browser platform, a type of a kernel architecture, a type of an operating system architecture, and a computing device model name. In another example, parameters may include an internet protocol (IP) address, such as a local IP address or public IP address that computing device 104 uses to connect to network 102. In another example, parameters may be associated with applications 110 or 112, and include a customer session identifier, a customer user identifier, a customer identifier, an application login or access time information, an advertising identifier, or a vendor identifier. In another example, parameters may include a geographical location, such as a geographical or GPS data that identifies a location of computing device 104. In another example, parameters may include a unique mobile identifier of computing device 104, such us an international mobile equipment identifier (IMEI). In another example, a parameter may be an operating system device identifier, such as an android device identifier or an android media access control (MAC) identifier. In another example, a parameter may be an indicator indicating whether a user using computing device 104 is rooted, that is, has access to privileged control or root access to administrative or super user permissions of an operating system executing on computing device 104. In another example, a parameter may be a MAC address of computing device 104. In another example, a parameter may be a unique identifier that may be changed or modified after a factory reset, such as a Google Service Framework Identifier (GSF ID). Notably, there may be other types of parameters that are not discussed or included in the examples above.

In some embodiments, the parameters in device data 208 may be mapped to device identifiers 206. Device analytics module 202 may also generate a device identifier from the one or more parameters in device data 208 and map the device identifier to device identifiers 206. The mapping identifies the device data 208 that is associated with device identifier 206. The device identifier 206 corresponds to one of computing devices 104. Although the embodiments below describe matching the parameters in device data 120 to parameters in device data 208, the matching may also apply to the device identifier 206I generated from the parameters in device data 120 to the device identifiers 206 generated from the parameters in device data 208.

In some embodiments, rules 204 may identify one or more parameters in device data 120 that may identify device identifier 206I of computing device 104. Device identifier 206I may be one of device identifiers 206. Specifically, rules 204 may indicate the one or more parameters in device data 120 that may be matched to parameters stored in device data 208 (or to the device identifier generated from the parameters) to determine device identifier 206I for computing device 104. Rules 204 or a set of rules 204 may be applied individually, in a combination, or sequentially to device data 120 to determine device identifier 206I.

In some embodiments, a rule in rules 204 may indicate a user cookie parameter in device data 120 and determine if the user cookie parameter (or a hash of the user cookie parameter) matches a user cookie in device data 208.

Another rule in rules 204 may determine a type of a software development toolkit (SDK) that is executing on computing device 104 or an operating system that is executing on computing device 104. An example SDK may be a JS SDK, an Android SDK, or an iOS SDK. Once device analytics module 202 determines a type of SDK of computing device 104, device analytics module 202 may select a set of rules in rules 204 that are specific to an SDK of computing device 104 and use one or more rules in the set of rules to determine device identifier 206I.

In some embodiments, a rule in rules 204 may include a combination of parameters. The combination of parameters may include a type of a browser platform, a local IP address and a public IP address. Another rule in rules 204 may include a combination of parameters that are a type of a kernel architecture, a type of an operating system architecture, and a local IP address. Yet another rule in rules 204 may include a combination of parameters that are a model name, a local IP address and a public IP address.

In some embodiments, a rule in rules 204 may determine device identifier 206I based on a location parameter. For example, a rule may include a customer information parameter, such as a customer session identifier or a customer user identifier and a location parameter. A location parameter may be a physical location of computing device 104. The rule may then determine a match between the customer session identifiers or the customer user identifiers in device data 120 and device data 208 when the location parameters in the device data 120 and device data 208 are within a predetermined or threshold distance, e.g. a threshold number of miles, from each other distance from each other. Notably, the rule may include other parameters instead of the customer session identifier or a customer user.

In some embodiments, a rule in rules 204 may determine device identifier 206I based on a temporal parameter. For example, a rule in rules 204 may include an IP identifier, such as a local IP address, a customer identifier, and a timestamp. The rule may then determine a match between the customer identifiers and IP identifiers in device data 120 and device data 208 when a timestamp is less than a threshold time, e.g. a threshold number of hours from a predetermined time, such as current time.

In some embodiments, a rule in rules 204 may include an IMEI parameter and determining a match between the IMEI parameter in device data 120 and IMEI parameter in device data 208. Another rule in rules 204 may indicate an operating system identifier parameter or a MAC-address parameter and determining a match between the operating system identifier parameter or a MAC-address parameter in device data 120 and device data 208. Another rule in rules 204 may indicate a GSF identifier parameter and determining a match between a GSF identifier parameter in device data 120 and a GSF identifier parameter in device data 208. Another rule in rules 204 may indicate an operating system identifier parameter and determining a match between an operating system identifier parameter in device data 120 and an operating system identifier parameter in device data 208.

In some embodiments, a rule in rules 204 may indicate an advertising identifier or a vendor identifier. The rule may then determine a match between the advertising identifier or the vendor identifier parameter in device data 120 and the advertising identifier or the vendor identifier parameter in device data 208.

In some embodiments, once device analytics engine 118 receives device data 120, device analytics engine may use rules 204 to determine device identifier 206I associated with device data 120. The determination may be based on device data 120 and device data 208. Based on device identifier 206I, device analytics module 202 may determine whether device data 120 is associated with a genuine computing device 104G or with fraudulent computing device 104F. In some embodiments, device analytics module 202 may evaluate multiple rules in rules 204 to determine device identifier 206I. The evaluation may continue until one of the rules in rules 204 determines the device identifier 206I. In some instances, the evaluation may be sequential, such that the multiple rules in rules 204 may be evaluated in sequence until one of the rules in rules 204 determines the device identifier 206I.

In some embodiments, device analytics module 202 may be pre-configured with a sequence of rules 204. For example, device analytics module 202 may initially use a rule in rules 204 that determines device identifier 206I using a user cookie included in device data 120. If device analytics module 202 does not identify device identifier 206I using a user cookie, device analytics module 202 may attempt to determine device identifier 206 using rules that include a combination of a local IP address, a public IP address, and other parameter(s). If device analytics module 202 does not identify the device identifier 206I using these rules in rules 204, device analytics module 202 may use rules in rules 204 that include a set of identified signal parameters, such as customer related identifiers, geographic location, IMEI, MAC identifiers, operating system identifiers, GSF identifiers, advertising identifiers, and/or vendor identifiers to name a few. Notably, this sequence of rules in rules 204 is exemplary, and device analytics module 202 may use another sequence of rules in rules 204 to determine device identifier 206I.

In some embodiments, device analytics module 202 may initially use a rule in rules 204 that extracts a user cookie from device data 120. The user cookie may include device identifier 206I or one or more parameters from which device identifier 206I may be generated. Device analytics module 202 may then match device identifier 206I against the device identifiers 206. If there is a match between device identifier 206I and device identifiers 206, device analytics engine 118 may use device identifier 206I to determine whether computing device 104 is a genuine computing device 104G or fraudulent computing device 104F. If there is no match between device identifier 206I and device identifiers 206, device analytics engine 118 may use one or more rules to determine device identifier 206I from device data 120.

In another embodiment, to determine device identifier 206I, device analytics module 202 may first identify a set of rules from rules 204. This identification may also occur if a user cookie rule described above is unable to generate device identifier 206I. The rules in the set of rules may be used individually, in a combination, or sequentially. The set of rules that device analytics module 202 applies to device data 120 may depend, in some embodiments, on a type of a software development toolkit (SDK) or an operating system that is executing on computing device 104. As discussed above, an example SDK may be a JS SDK, an Android SDK, or an iOS SDK. The device analytics module 202 may continue to evaluate each rule in the set of rules until one of the rules determines device identifier 206I.

In some embodiments, device analytics module 202 may determine device identifier 206I using a rule in the set of rules that evaluate a combination of parameters in device data 120. For example purposes only, the combination parameters may be a local and/or public IP parameter, browser platform parameters, kernel architecture parameters, operating system architecture parameters, and/or computing device model name parameters. The rule that identifies a particular combination of parameters from the above parameters may depend on the SDK parameter included in device data 120. For example, suppose a rule in rules 204 identifies that device analytics engine 118 receives device data 120 from computing device 104 with a JS SDK. In this case, device analytics module 202 may use a rule in rules 204 that evaluates a combination of parameters such as a browser platform parameter, a local IP parameter and a public IP parameter from device data 120. To evaluate the parameters, device analytics module 202 may combine the values of the browser platform parameter, the local IP parameter and the public IP parameter and generate a device identifier or a key from the combined values. One way to generate a device identifier may be to generate a hash of the combined values. Device analytics module 202 may then match the device identifier or the key to the device identifiers 206 or keys generated from the combined browser platform parameter, local IP parameter and public IP parameter from previously received device data 208. If a match is identified, device analytics module 202 identifies the device identifier 206I. Once device analytics module 202 identifies the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

In another example, suppose a rule in rules 204 identifies that device analytics engine 118 receives device data 120 from an Android SDK. In this case, device analytics module 202 may use a rule in rules 204 that evaluates a combination of parameters such as kernel architecture parameter, an operating system parameter, a local IP parameter and/or a public IP parameter from device data 120. To evaluate the parameters, device analytics module 202 may combine the values of the kernel architecture parameter, operating system parameters, the local IP parameter and the public IP parameter and generate a device identifier from the combined values. Device analytics module 202 may then match the generated device identifier to device identifiers 206 generated from the combined kernel architecture parameter, operating system parameters, the local IP parameter and the public IP parameter from previously received device data 208. If a match is identified, device analytics module 202 identifies the device identifier 206I. Once device analytics module 202 identifies the device identifier 206I, device analytics module 202 may use one or more of the device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G. In some embodiments, if device analytics module 202 identifies multiple device identifiers 206I, then device analytics module 202 may use multiple device identifiers 206I and the corresponding device data 208 to determine whether multiple computing device 104 are fraudulent computing devices 104F or genuine computing devices 104G.

In another example, suppose a rule in rules 204 identifies that device analytics engine 118 receives device data 120 from an iOS SDK. In this case, device analytics module 202 may use a rule in rules 204 that causes device analytics module 202 to evaluate a combination of parameters such as a computing device model name parameter, a local IP parameter and a public IP parameter from device data 120. To evaluate the parameters, device analytics module 202 may combine the values of the computing device model name parameter, operating system parameter, the local IP parameter and the public IP parameter and generate a device identifier from the combined values. Device analytics module 202 may then match the device identifier to the device identifiers 206 generated from the combined computing device model name parameter, operating system parameters, network information, e.g. the local IP parameter and/or the public IP parameter from the previously received device data 208. If a match is identified, device analytics module 202 may identify the device identifier 206I. Once device analytics module 202 identifies the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

In some embodiments, device analytics module 202 may not identify the device identifier 206I associated with device data 120 using a rule in rules that evaluates a combination of parameters discussed above. In this case, device analytics module 202 may use a set of rules in rules 204 that identify device identifier 206I using a set of identified signals. The set of identified signals may be signals that change infrequently because these signals are assigned to computing device 104 when it is generated or when computing device 105 is assigned to a new owner, a new network, etc. Device analytics module 202 may identify a set of rules that include a set of identified signals based on a type of SDK that is associated with computing device 104. Once identified, device analytics module 202 may evaluate each rule in the set of rules sequentially until one of the rules identifies device identifier 206I or device analytics module 202 tries all available rules in the set of rules that evaluate commons signals.

For example, suppose a rule in rules 204 identifies that device analytics engine 118 receives device data 120 from computing device 104 that uses JS SDK. In this case, device analytics module 202 may identify a set of rules in rules 204 that indicate common signals and are associated with the JS SDK. For example purposes only, device analytics module 202 may select a first rule in the set of rules that indicates a customer session identifier parameter and may compare the customer session identifier parameter in device data 120 with the customer session identifier parameter in device data 208. If there is a match, the rule may indicate for device analytics module 202 to compare the geographic location parameters in the device data 120 and device data 208, to determine whether the customer session identifier parameters in device data 128 and 120 are within a configurable distance of each other. If device analytics module 202 determines that device data 120 and device data 208 are within the configurable distance of each other, device analytics module 202 may determine that device identifier 206I is the device identifier 206 associated with the customer session identifier parameters in device data 208. Once device analytics module 202 identifies the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between the session identifier parameters in device data 120 and 208 that are within configurable distance, device analytics module 202 may proceed to the next rule in the set of rules. For example purposes only, the next rule may indicate a customer user identifier parameter and may compare the customer user identifier parameter in device data 120 with the customer user identifier parameter in device data 208. If there is a match, the rule may indicate for device analytics module 202 to compare the geographic location parameters in the device data 120 and device data 208, to determine whether the customer user identifier parameters in device data 120 and 208 are within a configurable distance of each other. If device analytics module 202 determines that the customer user identifier parameters in device data 120 and device data 208 are within the configurable distance of each other, device analytics module 202 may determine that device identifier 206I is the device identifier 206 associated with the customer user identifier parameters in device data 208. Once device analytics module 202 identifies the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between the customer user identifier parameters in device data 120 and 208 that are within a configurable distance, device analytics module 202 may proceed to the next rule in the set of rules. For example purposes only, the next rule may indicate a customer identifier and a local IP parameter and may compare the customer identifier and a local IP parameter in device data 120 with the customer identifier and a local IP parameter in device data 208. If there is a match, the rule may also cause device analytics module 202 to compare the timestamps in the device data 120 and device data 208, to determine whether the customer identifier and local IP parameters in device data 120 and 208 are within a threshold temporal difference of each other. Alternatively, the rule may cause the device analytics module 202 to compare the timestamp in device data 120 to the current time. If device analytics module 202 determines that timestamps in device data 120 and device data 208, or device data 120 and the current time, are within the configurable temporal difference of each other, device analytics module 202 may determine that device identifier 206I is the device identifier 206 associated with the customer identifier and local IP parameters in device data 208. Once device analytics module 202 identifies the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between all rules in the set of rules that indicate a set of identified signals and are associated with the Java Script SDK, device analytics module 202 may then generate a device identifier 206I for device data 120. Device analytics module 202 may also store the device identifier 206I and device data 120 in device identifiers 206 and device data 120 in device data 208 for analysis and comparison of subsequently received device data 120.

Suppose a rule in rules 204 identifies that device analytics engine 118 receives device data 120 from computing device 104 that uses an Android SDK. In this case, device analytics module 202 may identify a set of rules in rules 204 that indicate common signals and are associated with the Android SDK. For example purposes only, device analytics module 202 may select a first rule in the set of rules that indicates an IMEI parameter and may compare the IMEI parameter in device data 120 with the IMEI parameters in device data 208. If there is a match, device analytics module 202 may identify the device identifier 206I as one of device identifiers 206 that is associated with the IMEI parameter in device data 208. Once device analytics module 202 identifiers the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between the IMEI parameters in device data 120 and 208, device analytics module 202 may proceed to the next rule in the set of rules. For example purposes only, the next rule may indicate an Android identifier parameter and may compare the Android identifier parameter in device data 120 with the Android identifier parameters in device data 208. If there is a match, device analytics module 202 may also determine, in some instances, whether device data 120 includes a device rooted indicator parameter. If so, device analytics module 202 may determine that device identifier 206I is the device identifier 206 associated with the Android parameters in device data 208. Once device analytics module 202 identifies the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between the Android identifier parameters in device data 120 and 208, device analytics module 202 may proceed to the next rule in the set of rules. For example purposes only, the next rule may evaluate an Android MAC address parameter and may compare the Android MAC address parameter in device data 120 to the Android MAC addresses in device data 208. If there is a match, device analytics module 202 may also determine, in some instances, whether device data 120 includes a device rooted indicator parameter. If so, device analytics module 202 may determine that device identifier 206I is the device identifier 206 associated with the Android MAC address parameter in device data 208. Once device analytics module 202 identifies the device identifier 206I, device analytics module 202 may use the device identifier 206I to determine whether computing device 104 is a fraudulent computing device 104F or a genuine computing device 104G.

If device analytics module 202 does not determine a match between the Android MAC address parameters in device data 120 and 208, device analytics module 202 may proceed to the next rule in the set of rules. For example purposes only, the next rule may indicate a GSF parameter and may compare the GSF parameter in device data 120 with the GSF parameters in device data 208. If there is a match, device analytics module 202 may determine that device identifier 206I is the device identifier 206 associated with the GSF parameter in device data 208. Once device analytics module 202 identifies the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between the set of rules in rules 204 that indicate a set of identified signals and are associated with the Android SDK, device analytics module 202 may generate a device identifier 206I for device data 120, and store the device identifier 206I and device data 120 in device identifiers 206 and device data 208 for analysis and comparison with subsequently received device data 120.

Suppose a rule in rules 204 identifies that device analytics engine 118 receives device data 120 from computing device 104 that uses an iOS SDK. In this case, device analytics module 202 may use the set of rules in rules 204 that indicate a set of identified signals and are associated with the iOS SDK. For example purposes only, device analytics module 202 may select a first rule in the set of rules that evaluates an advertising identifier parameter. The advertising parameter may be associated with the iOS. The device analytics module 202 may compare the advertising identifier parameter in device data 120 with the advertising identifier parameter in device data 208. If there is a match, device analytics module 202 identifies the device identifier 206I as one of device identifiers 206 that are associated with the advertising identifier parameter in device data 208. Once device analytics module 202 identifiers the device identifier 206I, device analytics module 202 may use one or more of device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between the advertising identifier parameters in device data 120 and 208, device analytics module 202 may proceed to the next rule in the set of rules. For example purposes only, the next rule may indicate a vendor identifier parameter. The vendor identifier parameter may be associated with the iOS SDK. The device analytics module 202 may compare the vendor identifier parameter in device data 120 with the vendor identifier parameters in device data 208. If there is a match, device analytics module 202 may determine that device identifier 206I is the device identifier 206 associated with the vendor identifier in device data 208. Once device analytics module 202 identifies the device identifier 206I, device analytics module 202 may use device identifier 206I, device data 120, device data that corresponds to device identifier 206I that has previously been received and is stored in device data 208 and one or more rules for determining a device score to determine whether computing device 104 is a fraudulent computing device 104F or a genuine computing device 104G.

If device analytics module 202 does not determine a match between the set of rules in rules 204 that indicate a set of identified signals and are associated with the iOS SDK, device analytics module 202 may generate a device identifier 206I for device data 120 and store the device identifier 206I and device data 120 in device identifiers 206 and device data 120 for analysis and comparison of the subsequently received device data 120.

In some embodiments, to generate device identifier 206I, device analytics module 202 may use one or more parameters in device data 120. For example, device analytics module 202 may combine one or more parameters in the combinations discussed above to generate device identifier 206I.

Once device analytics module 202 determines or generates device identifier 206I, device analytics module 202 may determine whether the computing device 104 associated with device identifier 206I is genuine computing device 104G or fraudulent computing device 104F. To determine whether computing device 104 associated with device identifier 206I is genuine computing device 104G or fraudulent computing device 104F, device analytics module 202 may use one or more scoring rules, one or more parameters in device data 120 and/or one or more parameters in device data 208 that correspond to device identifier 206I to generate a device score. The device score may be a combined score of multiple scores that are associated with the parameters in device data 120 and/or 208.

In some embodiments, the rules may quantify the value of the parameters in device data 120 or a change in the value of parameters between the parameters in device data 120 and device data 208 that correspond to device identifier 206I. The rules may assign a positive or a negative score depending on a value of one or more parameters in device data 120 and/or device data 208. Further the positive and negative values within each rule may vary depending on the importance of the rule. An example rule may be whether device data 120 includes a parameter that indicates that the device is rooted. Another example rule may be a distance that computing device has travelled or whether the computing device has changed time zones which may be determined from the parameters in device data 120 and device data 208. Another example rule may be whether the device data 120 and/or device data 208 includes a parameter that indicates that computing device 104 is using a virtual machine, an IP proxy, or is spoofing an IP address. Notably, the rules listed above are exemplary, and there may be other rules that evaluate the parameters in device data 120 and/or device data 208. Further device analytics module 202 may select and evaluate one rule, a set of rules, or all rules from the score rules. Device analytics module 202 may also remove old rules and add new rules.

When device analytics module 202 evaluates the rules, device analytics module 202 may evaluate a rule where device data 120 indicates that an IP address, such as a public IP address is a proxy IP address that may be associated with a VPN or a proxy server. Device analytics module 202 may assign a negative IP score to this rule. In another example, if device identifier 206I was generated, device analytics module 202 may assign a high or positive device identifier score and if device identifier 206I was retrieved from device identifiers 206, device analytics module 202 may assign a low positive or negative score to this rule. This is because, device identifier 206I stored in device identifiers 206 may indicate that the same computing device 104 is attempting to make multiple transactions and may be fraudulent device 104F or a suspicious device. In another example, if the parameters in device data 120 and device data 208 indicate that computing device 104 has not changed time zones, device analytics module 202 may assign a positive score.

Similar scoring criteria may be applied to other parameters in device data 120 and/or device data 208.

As discussed above, device analytics module 202 may combine the scores from the rules into an overall score. The score may than be evaluated against one or more configurable thresholds that indicate that computing device 104 is fraudulent computing device 104F or genuine computing device 104. In some instances, a threshold may indicate that computing device 104 is a suspicious device. For example, when the device score is below a configurable threshold (or vice versa), device analytics module 202 may identify the computing device 104 as fraudulent computing device 104F.

In some embodiments, once device analytics module 202 identifies computing device 104 as fraudulent computing device 104F, device analytics module 202 may generate a message 210 that causes the payment provider server 108, service provider server 106, and/or applications 110, 112 to block transactions that originate from fraudulent computing device 104F. If device analytics module 202 identifies computing device 104 as a suspicious device, device analytics module 202 may generate a message 210 that notifies the payment provider server 108, service provider server 106, and/or applications 110, 112 of the suspicious activity and may cause the payment provider server 108, service provider server 106, and/or applications 110, 112 to monitor transactions from the suspicious device.

In the embodiment where device analytics module 202 identifies candidate device identifiers 206I, device analytics module 202 may determine the score for each candidate device identifier 206I to determine whether the candidate device identifier corresponds to genuine computing device 104F or fraudulent computing device 104G.

Figure 3:
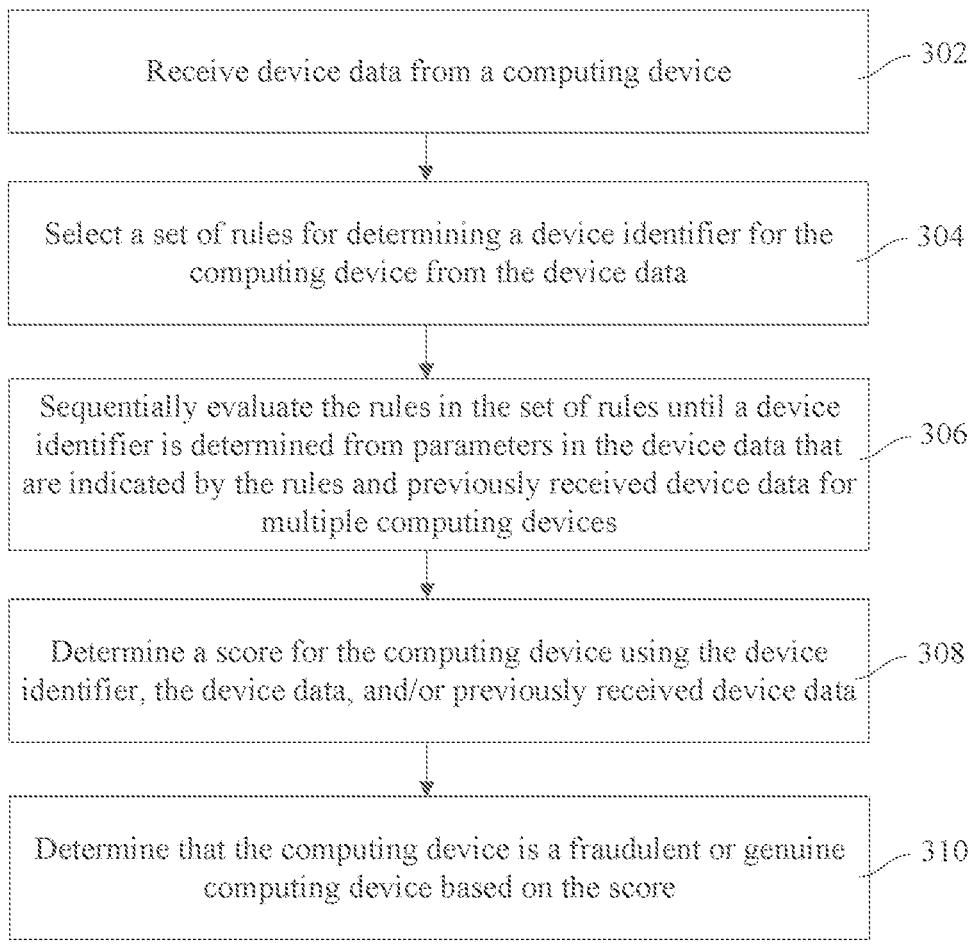
FIG. 3 is a flowchart of a method for determining a device as a legitimate or a fraudulent device, according to an embodiment.

FIG. 3 is a flowchart of a method 300 for determining a genuine or fraudulent computing device from device data, according to an embodiment. Method 300 may be performed using hardware and/or software components described in FIGS. 1-2. Note that one or more of the operations may be deleted, combined, or performed in a different order as appropriate.

At operation 302, device data is received. For example, device analytics engine 118 receives device data 120 from computing device 104. As discussed above, computing device 104 may perform a transaction with service provider server 106 or payment provider server 108 using one or more messages that include device data 120.

At operation 304, a rule or a set of rules is identified. For example, device analytics engine 118 may store rules 204 that device analytics module 202 may use to determine device identifier 206I associated with computing device 104. The rules 204 may indicate a parameter or a combination of parameters that device analytics module 202 may evaluate to determine device identifier 206I from device data 120, device data 208, and/or device identifiers 206. Device analytics module 202 may also include instructions that determine a rule or a set of rules in rules 204 that device analytics module 202 may use for determining device identifier 206I. As discussed above, the set of rules may be based on the SDK parameter in device data 120.

At operation 306, a device identifier is determined by evaluating a rule or a set of rules. For example, device analytics module 202 may evaluate the parameters in device data 120 indicated in a rule or in each rule in the set of rules and compare the parameters indicated in the rule to the parameters in device data 208 to determine device identifier 206I. Device analytics module 202 may alternatively compare the device identifiers that correspond to the parameters. Device analytics module 202 may evaluate each rule in the set of rules until one of the rules determines device identifier 206I. In some instances, device analytics module 202 may evaluate each rule in the set of rules in a sequence until one of the rules determine device identifier 206I. If device analytics module 202 is unable to determine device identifier 206I, device analytics module 202 may generate device identifier 206I from device data 120. Further description of the types of rules that may be evaluated is described in FIG. 4, below.

At operation 308, a score for a computing device that corresponds to the device identifier is determined. For example, device analytics module 202 may use the device identifier 206I, device data 120, and device data 208 that is associated with device identifier 206I to determine a score. The score may be a combination of multiple scores based on the values of the one or more parameters in device data 120 and device data 208, and/or whether device identifier 206I was determined or generated.

At operation 310, a fraudulent or genuine computing device is determined. For example, depending whether the score determined in operation 308 is above a fraud threshold (or vice versa), device analytics module 202 may determine that computing device 104 that generated device data 120 is a fraudulent computing device 104F or genuine computing device 104G.

Figure 4:
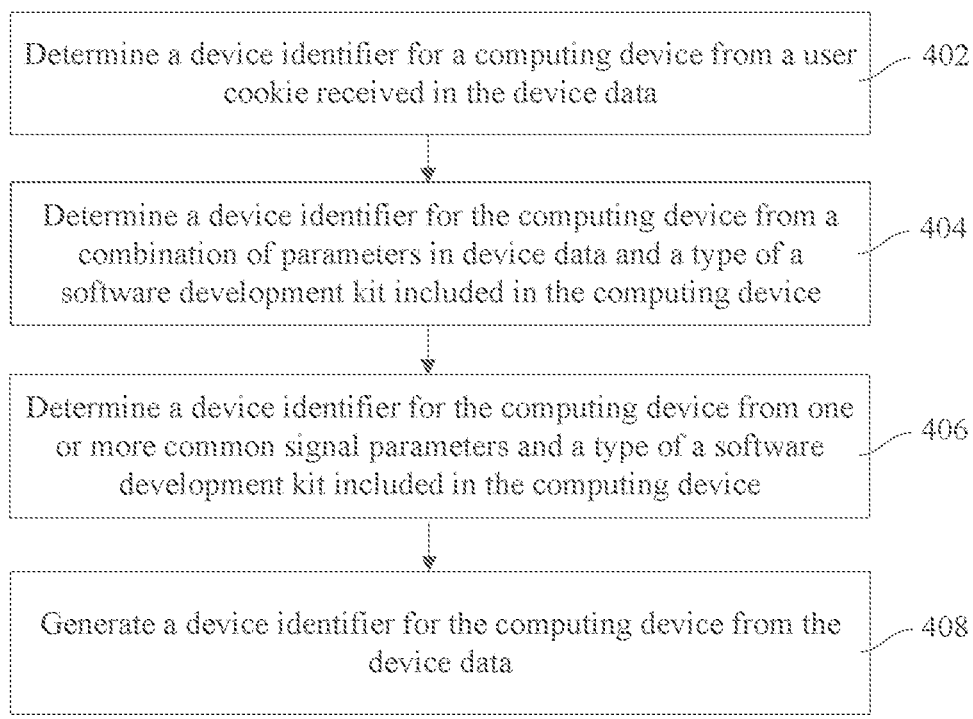
FIG. 4 is a flowchart of a method for implementing rules that determine a device identifier, according to an embodiment.

FIG. 4 is a flowchart of a method 400 for determining a device identifier using a sequence of rules, according to an embodiment. Method 400 may be performed using hardware and/or software components described in FIGS. 1-2. Note that one or more of the operations may be deleted, combined, or performed in a different order as appropriate.

At operation 402, a device identifier is determined from a rule evaluating a user cookie. For example, device analytics module 202 retrieves a rule from rules 204 that indicates a user cookie. Using the rule, device analytics module 202 extracts the user cookie parameter from device data 120 and determines if the user cookie parameter matches one of the user cookies parameters stored in device data 208. If so, device analytics module 202 may determine the device identifier 206I as one of the device identifiers 206I associated with the user cookie in device data 208 and method 400 ends and operations proceed to operation 306 of FIG. 3. Otherwise, the method proceeds to operation 404.

At operation 404, a device identifier is determined from a combination of parameters and a type of an SDK. For example, device analytics module 202 may use a rule in rules 204 that determines a type of an SDK. Using the rule, device analytics module 202 may extract the SDK parameter from device data and use the SDK parameter to determine a type of an SDK that executes on computing device 104 from device data 120. Based on the type of the SDK, device analytics module 202 may determine a rule or a set of rules in rules 204 that indicates a combination of parameters in device data 120 that device analytics module 202 may use to determine device identifier 206I. The combination of parameters may be different for different SDKs. An example combination of parameters may include one or more of a local IP address parameter, a public IP address parameter, a kernel architecture, a browser platform, an operating system architecture, or a model of computing device 104. Device analytics module 202 may select the parameters indicated in the rule from device data 120, combine the parameters, and determine if the combined parameters or a hash of the combined parameters matches the combined parameters or the hash of the combined parameters in device data 208. If so, the device identifier 206I is identified as one of the device identifier 206 that is associated with the matched device data 208, method 400 ends and operations proceed to operation 306 of FIG. 3. Otherwise, method 400 proceeds to operation 406.

At operation 406, a device identifier is determined using a set of identifier signals. The set of identifier signals correspond to parameters in device data 120. As in operation 404, device analytics module 202 may initially use a rule in rules 204 that identifies the type of the SDK of the computing device 104 from device data 120. Once the type of the SDK is identified, the device analytics module 202 may select a set of rules in rules 204 that indicate the common signals based on a type of SDK. Device analytics module 202 may traverse each rule in set of rules until one of the rules includes one or more common signal that identify device identifier 206I from device data 120 and device data 208. If device analytics module 202 identifies device identifier 206I from the set of identifier signals, the method 400 ends and operations proceed to operation 306 of FIG. 3. Otherwise, method 400 proceeds to operation 408.

At operation 408, a device identifier is generated. For example, if none of the operations 402-406 determine the device identifier 206I, then device analytics module 202 may generate the device identifier 206I from one or more parameters in device data 120. Once the device identifier 206I is generated, method 400 ends and operations proceed to operation 306 of FIG. 3.

Figure 5:
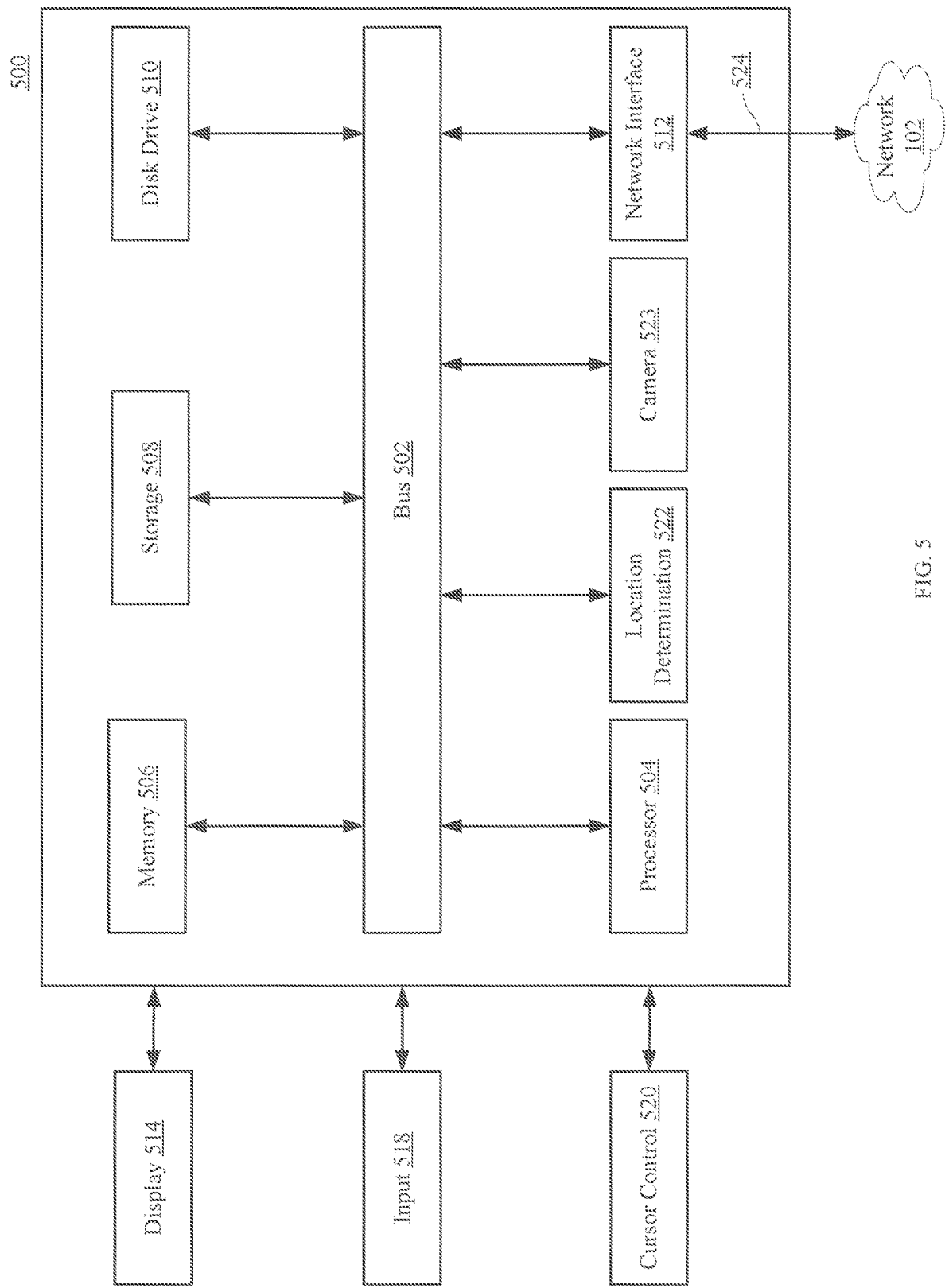
FIG. 5 is a block diagram of a computer system suitable for implementing one or more components or operations in FIGS. 1-4 according to an embodiment.

Referring now to FIG. 5 an embodiment of a computer system 500 suitable for implementing, the systems and methods described in FIGS. 1-4 is illustrated.

In accordance with various embodiments of the disclosure, computer system 500, such as a computer and/or a server, includes a bus 502 or other communication mechanism for communicating information, which interconnects subsystems and components, such as a processing component 504 (e.g., processor, micro-controller, digital signal processor (DSP), graphics processing unit (GPU), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the disclosure, the computer system 500 performs specific operations by the processor 504 executing one or more sequences of instructions contained in the memory component 506, such as described herein with respect to the mobile communications devices, mobile devices, and/or servers. Such instructions may be read into the system memory component 506 from another computer readable medium, such as the static storage component 508 or the disk drive component 510. In other embodiments, hard-wired circuitry may be used in place of or in combination with software instructions to implement the disclosure.

Logic may be encoded in a computer readable medium, which may refer to any medium that participates in providing instructions to the processor 504 for execution. Such a medium may take many forms, including but not limited to, non-volatile media, volatile media, and transmission media.

In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 500. In various other embodiments of the disclosure, a plurality of the computer systems 500 coupled by a communication link 524 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:
    receiving device data from a computing device, the device data including a plurality of parameters associated with the computing device;
    identifying a parameter in the plurality of parameters for selecting a set of rules in a plurality of rules for determining a device identifier;
    selecting, using the parameter, the set of rules in the plurality of rules, wherein the set of rules include logic for comparing at least one parameter in the plurality of parameters in the device data of the computing device to at least one parameter of previously received device data from multiple computing devices;
    evaluating, using the logic, the set of rules in a sequential order until the device identifier is determined by comparing the at least one parameter in the device data of the computing device to the at least one parameter of the previously received device data;
    determining a score for the computing device using the device identifier and the at least one parameter of the device data of the computing device; and
    determining whether the computing device is a fraudulent computing device based on the score.

2. The method of claim 1, wherein the evaluating further comprises:
    evaluating the set of rules until all rules in the set of rules have been evaluated, wherein the evaluating does not determine the device identifier; and
    generating the device identifier from a subset of parameters in the plurality of parameters in the device data of the computing device.

3. The method of claim 1, wherein the evaluating further comprises:
    identifying a rule in the set of rules that selects a user cookie parameter in the device data of the computing device;
    comparing the user cookie parameter to a plurality of previously received user cookie parameters from previously received device data, the plurality of previously received user cookie parameters corresponding to a plurality of device identifiers;
    identifying a match between the user cookie parameter and one of the previously received user cookie parameters; and
    determining the device identifier of the computing device as a device identifier that corresponds to the one of the previously received user cookie parameters.

4. The method of claim 1, wherein the parameter in the plurality of parameters for selecting the set of rules is a type of a software development toolkit (SDK) used by the computing device.

5. The method of claim 1, wherein the evaluating further comprises:
    identifying a rule in the set of rules that combines values of parameters in the plurality of parameters of the computing device indicated in the rule;
    combining the values of the parameters;
    generating a first device identifier from the combined values of the parameters;
    selecting a second device identifier in a plurality of device identifiers generated from previously received device data that matches the first device identifier; and
    determining the device identifier as the second device identifier.

6. The method of claim 5, wherein the plurality of parameters of the computing device include at least three of a local internet protocol (IP) address parameter, a public IP address parameter, an operating system parameter, a kernel parameter, a device model parameter or a platform parameter.

7. The method of claim 1, wherein the evaluating further comprises:
    identifying a rule in the set of rules that indicates a first parameter that corresponds to an attribute of the computing device and a second parameter that corresponds to a location of the computing device;
    matching the first parameter to a first parameter in the previously received device data, the previously received device data corresponding to a plurality of device identifiers; and
    determining the device identifier of the computing device as a device identifier that corresponds to the first parameter in the previously received device data when a distance between the second parameter of the computing device and a second parameter in the previously received device data is less than a predetermined threshold.

8. The method of claim 1, wherein the evaluating further comprises:
    identifying a rule in the set of rules that indicates a first parameter in the device data of the computing device;
    matching the first parameter to a first parameter in previously received device data, the previously received device data corresponding to a plurality of device identifiers; and
    determining the device identifier of the computing device as a device identifier that corresponds to the first parameter in the previously received device data.

9. The method of claim 8, wherein determining the score further comprises:
    determining the score using a second set of score rules and one or more parameters in the previously received device data associated with the determined device identifier.

10. The method of claim 1, wherein the evaluating further comprises:
    identifying a rule in the set of rules that indicates a first parameter that corresponds to an attribute of the computing device, a second parameter that corresponds to an IP address of the computing device, and a temporal parameter of the computing device;
    matching the first parameter of the computing device to a first parameter in a previously received device data and the second parameter of the computing device to a second parameter in the previously received device data, the previously received device data corresponding to a plurality of device identifiers; and
    determining the device identifier of the computing device as a device identifier that corresponds to the first parameter and the second parameter in the previously received device data when a time difference between the temporal parameter of the computing device and a temporal parameter in the previously received device data that corresponds to the device identifier is less than a temporal threshold.

11. The method of claim 1, wherein the evaluating further comprises:
identifying a rule in the set of rules that indicates parameters in the device data of the computing device corresponding to attributes of the computing device;
generating a first device identifier from the parameters in the device data of the computing device;
matching the first device identifier to a second device identifier generated from parameters in the previously received device data; and
determining the device identifier based on the matching.

12. The method of claim 11, wherein the rule indicates a location parameter in the device data of the computing device; and
wherein the matching further comprises determining the location parameter is within a configurable distance from a location parameter associated with a hash.

13. The method of claim 1, wherein determining whether the computing device is the fraudulent computing device further comprises:
determining the score for the computing device, wherein the score is based on the device identifier and a subset of parameters in the plurality of the parameters of the computing device; and
determining whether the computing device is the fraudulent computing device when the score is below a predetermined threshold.

14. A system, comprising:
a non-transitory memory storing instructions; and
one or more hardware processors coupled to the non-transitory memory and configured to read the instructions from the non-transitory memory to cause the system to perform operations comprising:
receiving device data from a computing device, the device data including a plurality of parameters associated with the computing device;
identifying a parameter in the plurality of parameters for selecting a set of rules in a plurality of rules for determining a device identifier;
selecting, using the parameter, the set of rules in the plurality of rules, wherein the set of rules indicate a sequential order for applying the set of rules and include logic for comparing at least one parameter in the plurality of parameters in the device data of the computing device to at least one parameter of previously received device data of multiple computing devices;
evaluating, using the logic, the set of rules in the sequential order until a rule in the set of rules determines the device identifier by comparing at least two parameters of the device data from the computing device indicated in the rule to at least two parameters in the previously received device data from the multiple computing devices;
determining a score for the computing device using the device identifier; and
determining whether the computing device is a fraudulent computing device based on the score.

15. The system of claim 14, wherein evaluating the set of rules comprises:
identifying a rule in the set of rules that selects a user cookie parameter in the device data of the computing device; and
determining the device identifier of the computing device using the user cookie parameter and previously received user cookie parameters in the previously received device data.

16. The system of claim 14, wherein the parameter in the plurality of parameters for selecting the set of rules is
a type of a software development toolkit (SDK) used by the computing device.

17. The system of claim 16, wherein the parameter in the plurality of parameters for selecting the set of rules
corresponds to an attribute of the computing device and the identifying further comprises identifying a second parameter that corresponds to an IP address of the computing device; and
selecting the set of rules further comprises using the parameter and the second parameter.

18. The system of claim 16, wherein the parameter in the plurality of parameters for selecting the set of rules
corresponds to an attribute of the computing device and the identifying further comprises identifying a second parameter that corresponds to a location of the computing device; and
selecting the set of rules further comprises using the parameter and the second parameter.

19. The system of claim 14, wherein evaluating the set of rules further comprises:
identifying a rule in the set of rules that indicates a first parameter that corresponds to an attribute of the computing device, a second parameter that corresponds to an IP address of the computing device, and a temporal parameter of the computing device;
matching the first parameter to a first parameter in the previously received device data and the second parameter to a second parameter in the previously received device data, the previously received device data corresponding to a plurality of device identifiers; and
determining the device identifier of the computing device as a device identifier that corresponds to the first parameter and the second parameter in the previously received device data when a time difference between the temporal parameter of the computing device and a temporal parameter in the previously received device data that corresponds to the device identifier is less than a temporal threshold.

20. A non-transitory machine-readable medium having stored thereon machine-readable instructions executable to cause a machine to perform operations for determining whether a computing device is engaging in a fraudulent transaction, the operations comprising:
receiving device data from the computing device in a network with multiple computing devices, the device data including a plurality of parameters associated with the computing device;
identifying a parameter in the plurality of parameters for selecting a set of rules in a plurality of rules for determining a device identifier;
selecting, using the parameter, the set of rules in the plurality of rules, wherein the set of rules includes logic for comparing at least one parameter in the plurality of parameters in the device data of the computing device to at least one parameter of previously received device data of multiple computing devices;
evaluating, using the logic, the set of rules in a sequential order until the device identifier is determined by comparing the at least one parameter in the plurality of parameters in the device data of the computing device indicated in the set of rules to the at least one parameter in the previously received device data from the multiple computing devices;
determining a score for the computing device, wherein the score is based on the device identifier and values of a subset of parameters in the plurality of the parameters of the device data of the computing device; and determining whether the computing device is engaging in the fraudulent transaction based on the score.

\* \* \* \* \*